United States Patent [19]

Kuppenheimer, Jr. et al.

[11] 4,352,186
[45] Sep. 28, 1982

[54] LASER CRYSTAL

[75] Inventors: John D. Kuppenheimer, Jr., Tewksbury, Mass.; James W. Baer, Nashua, N.H.

[73] Assignee: Sanders Associates, Inc., Nashua, N.H.

[21] Appl. No.: 129,945

[22] Filed: Mar. 13, 1980

[51] Int. Cl.³ .............................................. H01S 3/14
[52] U.S. Cl. .............................. 372/41; 252/301.17; 252/301.18
[58] Field of Search ...................... 331/94.5 F, 94.5 E

[56] References Cited

U.S. PATENT DOCUMENTS 3,427,566  2/1969  Hoskins et al. ............... 331/94.5 F

OTHER PUBLICATIONS

"The Growth and Laser Characteristics of Yttium-Gadolinium-Aluminum Garnet Single Crystals" Cockayne et al., Jour. Phys. Chem. Solds vol. 29, pp. 905-910.

"Growth, Optical Properties, and CN Laser Action of Neodymium Doped Gadolinium Scardium Aluminum Garnet" Brandle, J. et al., IEEE Jour. Quant. Elect. vol. QE-10, No. 1, p. 67, Jan. 1974.

Primary Examiner—William L. Sikes
Assistant Examiner—Léon Scott
Attorney, Agent, or Firm—Louis Etlinger; Richard I. Seligman

[57] ABSTRACT

Improved laser system gain is achieved by using Gadolinium to totally replace the Yttrium in a Lithium Yttrium Fluoride (YLF) host crystal so as to increase the amount of Neodymium which can be doped into the host crystal.

2 Claims, 1 Drawing Figure

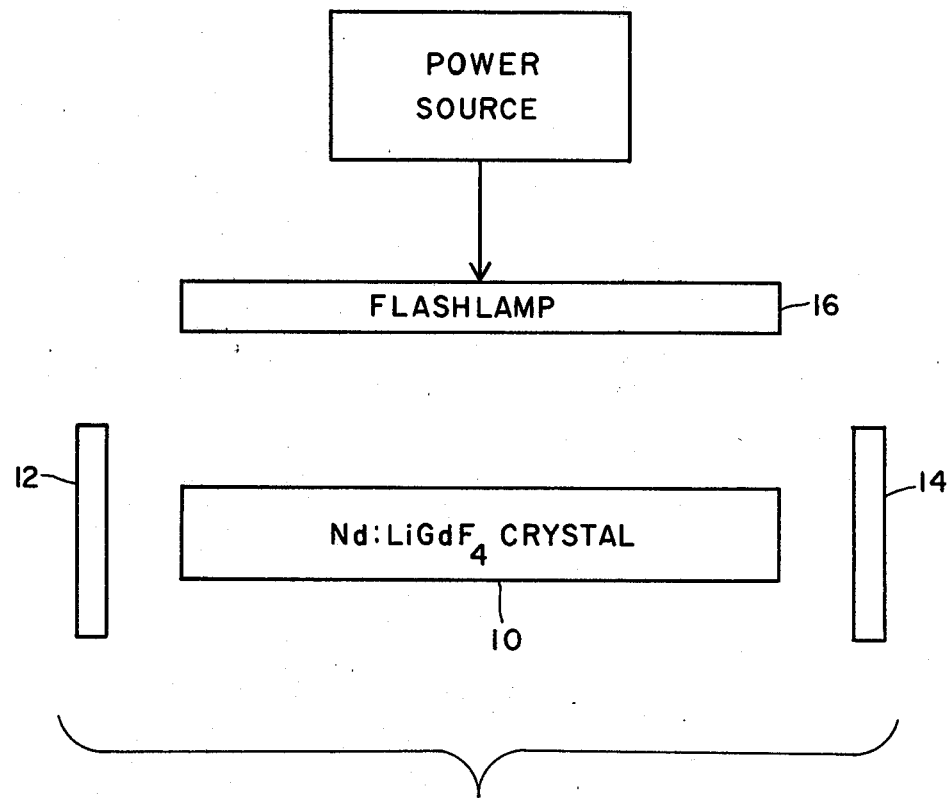

LASER CRYSTAL

BACKGROUND OF THE INVENTION

This invention relates to lasers and, more particularly, to improved host crystals therefor.

Presently there are many laser systems, for military and commercial applications, which operate on the 1.06 μm transition of Neodymium (Nd). Most of the present operating systems use Yttrium Aluminum Garnate (YAG) as a host crystal. The only other commercialized hosts are non-crystalline glasses, and crystals of YLF and YALO.

Because the dopant ion $Nd^{3+}$ is much larger (1.04 A vs. 0.92 A in radius) than the Yttrium ion it replaces, the strain on the lattice limits the amount of $Nd^{3+}$ that can be doped in without degrading the crystal uniformity. Because this limit is so low, approximately 1% substitution, most Nd:YAG is grown at the limit of dopant density.

In order to increase the limiting density of $Nd^{3+}$ in YAG, attempts have been made to stretch the lattice by partially substituting Gadolinium ($Gd^{3+}$) with an ion radius of 0.97 A for Yttrium. Substituting $Gd^{3+}$ for $Y^{3+}$ did in fact expand the lattice. However, substitution is limited to approximately one quarter of the $Y^{3+}$ ions, and greater concentrations, especially 100% or complete substitution, degrade the crystal.

Accordingly, it is an object of this invention to provide an improved laser crystal.

It is a further object of this invention to provide a substitute for a Nd:YAG laser which is more efficient.

SUMMARY OF THE INVENTION

Briefly, the objects of this invention are achieved by replacing the $Y^{3+}$ component of a $LiYF_4$ host crystal with $Gd^{3+}$ so as to enlarge the crystal matrix to accommodate larger concentrations of $Nd^{3+}$ ions.

BRIEF DESCRIPTION OF THE DRAWING

The above-mentioned and other features and objects of this invention will become more apparent by reference to the following description taken in conjunction with the accompanying drawing which is a block diagram of a laser.

DESCRIPTION OF THE PREFERRED EMBODIMENTS

In order to increase the amount of $Nd^{3+}$ which can be doped into laser crystals, $Gd^{3+}$ is substituted 100% for $Y^{3+}$ in a $LiYF_4$ crystal thereby to provide a $LiGdF_4$ host crystal wherein the crystal matrix is enlarged to accommodate the larger $Nd^{3+}$ ions and, thus, much higher concentrations thereof.

A laser employing a $Nd:LiGdF_4$ rod will provide substantially higher system gains than a Nd:YAG laser, the most commonly used laser employed in military systems. The FIGURE illustrates such a laser which comprises a crystal 10 disposed between a pair of mirrors 12 and 14 forming an optical resonator. In conventional manner one of mirrors 12, 14 is totally reflecting and one partially reflecting. If desired reflective materials can be deposited on the ends of crystal 10 in place of mirrors 12 and 14.

The crystal is $Nd^{3+}$ doped $LiGdF_4$ with substantial amounts of $Nd^{3+}$ doped into the $LiGdF_4$ host. Pump energy is supplied by a flashlamp 16. However, other means can be employed to pump the crystal such as, for example, another laser.

A $Nd:LiGdF_4$ crystal can be grown in substantially the same manner as $Nd:LiYF_4$ or otherwise doped $LiYF_4$ crystals. The primary steps in growing such a crystal include mixing Gadolinium oxide ($Gd_2O_3$) and Neodymium oxide ($Nd_2O_3$). The resultant mixture is fluorinated by passing HF over it to produce $GdF_3 + NdF_3 + H_2O$. After removal of the water lithium fluoride (LiF) is added to the mixture.

The mixture is placed in a crucible in an evacuated furnace and heated sufficiently to melt the mixture. Any undissolvable surface material floating on the melt is then removed.

A $LiGdF_4$ seed crystal is suspended from a cooled seed rod and lowered to touch the melt which melts the end of the seed. The seed rod is then additionally cooled and moved upward to pull the crystal.

In the event a $LiGdF_4$ crystal is unavailable as a seed, a $LiYF_4$ crystal may be employed. This may leave some trace amount of $Y^{3+}$ in the resultant crystal.

While we have described above the principles of our invention in connection with specific apparatus, it is to be clearly understood that this description is made only by way of example and not as a limitation of the scope of an invention as set forth in the accompanying claims.

We claim:
1. A crystal, comprising:
   a Lithium Gadolinium Fluoride host material; and active ions of Neodymium wherein the concentration of Neodymium ions is higher than four percent.
2. A laser, comprising:
   a resonant cavity;
   means for abstracting energy from said cavity;
   an active crystal disposed in said cavity, said crystal including a Lithium Gadolinium Fluoride host doped with active ions of Neodymium wherein the concentration of Neodymium active ions is higher than four percent; and
   means for pumping said crystal.

* * * * *